3,669,798
PRESSURE SENSITIVE COHESION
James D. Brown and Carl A. Uraneck, Bartlesville, Okla., assignors to Phillips Petroleum Company
No Drawing. Filed Nov. 18, 1970, Ser. No. 90,783
Int. Cl. C09j 5/00, 3/26
U.S. Cl. 156—334      16 Claims

ABSTRACT OF THE DISCLOSURE

Surfaces are bonded together with an adhesive formulation which is an unsaturated polymer of a cyclic monoolefin and a tackifier, e.g., an ester of a partially hydrogenated rosin.

FIELD OF THE INVENTION

This invention relates to a process for bonding two surfaces together. In a further aspect, this invention relates to adhesive compositions.

DESCRIPTION OF THE PRIOR ART

The prior art has presented various adhesives useful for the bonding of surfaces one to another. Because of the competitive nature of the current economic community, the search for new and different adhesive formulations continues. New advances in polymer technology have aided in the discovery of new and improved adhesive formulations by providing synthetic elastomers tailored for adhesive applications.

OBJECTS OF THE INVENTION

It is an object of this invention to bond two surfaces of the same or different materials together. It is a further object of the invention to provide a new and useful adhesive formulation. Other objects and advantages of this invention will be apparent from the following summary of the invention, detailed description of the invention, and claims.

SUMMARY OF THE INVENTION

We have discovered an adhesive formulation which comprises an unsaturated polymer of a cyclic monoolefin and a suitable tackifier material, e.g., an ester of a partially hydrogenated rosin.

Further in accordance with the invention, we have discovered a method of bonding two surfaces of material together by the application of the above-mentioned adhesive formulation, i.e., an unsaturated polymer of a cyclic monoolefin and a suitable tackifier material.

DETAILED DESCRIPTION OF THE INVENTION

The polymers which can be employed to prepare the adhesive formulations of the present invention include unsaturated polymers of cyclic monoolefins wherein the monomer has 5 and 7–10 carbon atoms in the ring, and includes alkyl-substituted derivatives thereof wherein the alkyl group has from 1 to about 6 carbon atoms per molecule which alkyl group is located no closer than the 4-position with respect to the double bond. Non-limited exemplary compounds include cyclopentene, cycloheptene, cyclooctene, cyclononene, cyclodecene, 4-methylcyclopentene, 4-ethylcyclopentene, 4-hexylcyclodecene, and 4-pentylcyclopentene, and the like. Unsubstituted cyclic monoolefins are preferred.

Copolymers of cyclic monoolefins and cyclic polyolefins or omega-alkenyl-polycycloalkene compounds can also be employed. The copolymerization of these monomers is believed to result in a branched polymer having reduced cold flow when compared to the homopolymers of the above-mentioned cyclic monoolefins. Suitable cyclic polyolefin comonomers include those cyclic hydrocarbons having at least two carbon-carbon double bonds separated by one carbon-carbon single bond or fused ring cyclic polyolefins having at least one carbon-carbon double bond in each of at least two of the rings. The omega-alkenyl-polycycloalkene comonomers are dienes containing a terminal unsaturation of the vinyl type in an aliphatic chain and unsaturation in a polycyclic system. Mixtures of the above-described cyclic polyolefins and omega-alkenyl-polycycloalkenes can be employed.

Representative examples of these comonomers include cyclopentadiene,
1,3-cyclohexadiene,
1,3-cyclooctadiene,
1,3,5-cyclooctatriene,
1,3,5-cyclododecatriene,
1,2,3,4,4a,8a-hexahydronaphthalene,
dicyclopentadiene,
bicyclo(2,2,1)-hepta-2,5-diene,
tricyclo(5,2,3,0$^{4,9}$)-dodeca-2,5,11-triene,
bicyclo(2,2,1)octa-2,5,7-triene,
bicyclo(8,6,4)-eicosa-2,11-diene,
2-vinyl-bicyclo(2,2,1)-heptene-5, i.e.,
(5-vinyl-2-norbornene),
2-buten-3-yl-bicyclo(2,2,1)-heptene-5,
2-allyl-bicyclo(2,2,1)-heptene-5,
2-vinyl-bicyclo(2,2,2)octene-5,
2-vinyl-1,4-indomethylene-1,2,3,4,5,5a,8,8a-octahydronaphthalene,
3-allylindene, and the like.

The unsubstituted conjugated dienes (e.g., cyclopentadiene), dicyclopentadiene, and 5-vinyl-3-norbornene are the preferred comonomers when the cyclic monoolefin monomer is cyclopentene.

The polymerization of the above-mentioned cyclic monoolefins in the presence or absence of the above-mentioned comonomers can also be accomplished in the presence of a second class of suitable comonomers, i.e., acyclic olefins. These comonomers provide a polymer having reduced molecular weight when compared to the homopolymers and copolymers of the cyclic monoolefins mentioned above. Thus, a suitable polymer which has both reduced cold flow and controlled molecular weight can be prepared by using a selected comonomer of each of the above-mentioned classes of comonomers. Variation in the amounts of these materials can provide a polymer suitably tailored for use in the adhesive formulations of the invention.

The acyclic olefins employed are nontertiary acyclic mono- and polyenes having at least 2 carbon atoms per molecule, including cycloalkyl, cycloalkenyl, and aryl derivatives thereof, and mixtures of these olefins. Acyclic olefins having from 2 to about 30 carbon atoms are preferred. Especially good results are obtained with acyclic monoolefins and diolefins having from 5 to about 10 carbon atoms per molecule. Nontertiary olefins are those olefins having at least one double bond wherein the carbon atoms, which are attached to each other by means of the double bond, are also attached to at least one hydrogen atom.

Some specific examples of acyclic olefins which are suitable comonomers include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,3-pentadiene, 1,4-pentadiene, 1,4,7-dodecatriene, 2-methyl-4-octene, 4-vinylcyclohexene, 1,3-octadiene, 1,7-octadiene, 3,5-decadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl-1,4-octadiene, and the like, and mixtures thereof.

The amount of omega-alkenyl-polycycloalkene, polycyclic olefins or mixtures thereof employed to prepare the copolymers of the cyclomonoolefin can be varied over a wide range. Amounts in the range of from about 0.01 to about 500 millimoles per 100 grams of other monomers (mhm.) is generally acceptable to achieve the desired properties for adhesive applications. Preferably the amount is in the range of from 1–200 mhm. These comonomers can be added initially or at any time prior to shortstopping of the polymerization reaction.

At higher levels, the omega-alkenyl-polycycloalkene type of comonomer tends to produce gel-containing products. However, this tendency can be reduced by increasing the level of acyclic olefin employed in the polymerization recipe when preparing polymers containing the acylic olefin monomer. When preparing the copolymers of the invention in the absence of the acyclic olefin monomers, suitable low levels of omega-alkenyl-polycycloalkene monomers can be employed when gel-free products are desired.

When preparing the terpolymers of the invention, the lower molecular weight acyclic olefins such as ethylene, propylene, butenes, pentenes, and hexenes are most frequently employed. The terpolymer exhibits a desirable balance of the properties of cold flow and molecular weight. The amount of lower molecular weight acyclic olefin employed generally determines the extent of the reduction in inherent viscosity. Single olefins or mixtures of olefins can be used in the process. Amounts are generally in the range of 0.01 to 10, preferably about 0.05 to 1.0, part by weight per 100 parts by weight of the other monomers.

The polymerization of the above-described monomers is accomplished by the use of a catalyst known in the art as an olefin disproportionation catalyst. These catalysts have heretofore been employed to convert olefinic materials into other olefinic materials wherein the reaction can be visualized as the reaction between two first pairs of carbon atoms, the two carbon atoms of each first pair being connected by a double bond, to form two new pairs from the carbon atoms of the first pairs, the two carbon atoms of each new pairs being connected by a double bond. Although not completely understood, it is believed the disproportionation reaction occurs via a saturated transition state intermediate. Thus, the reaction can be illustrated by the following formulas:

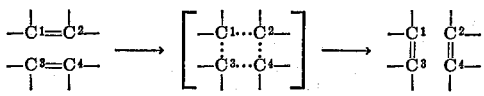

Other terms have been employed in the art to describe the olefin disproportionation reaction and catalysts which effect this reaction. They include such terms as "olefin reaction," "olefin dismutation," "transalkylidenation" and "olefin metathesis."

Any catalyst having activity for converting olefins in accordance with the above-described olefin disproportionation reaction can be employed to prepare the copolymers of the invention. These include both heterogeneous catalysts which are capable of olefin disproportionation activity in the presence or absence of a liquid hydrocarbon solvent and homogeneous catalysts which generally utilize the presence of a diluent during the reaction. Of course, where the olefin or monomer is liquid under normal reaction conditions, it can function as a diluent for the homogeneous catalysts. For the preparation of the copolymers of the invention, the homogenous catalysts are preferred.

The heterogeneous catalysts which are particularly suitable for the polymerization reaction include tungsten oxide on silica, tungsten oxide on alumina, molybdenum oxide on alumina, rhenium oxide on alumina, molybdenum oxide on alumina phosphate, molybdenum hexacarbonyl on alumina and any of the above admixture with an organometal reducing agent such as methylaluminum sesquichloride. These catalysts are disclosed in U.S. Pats. 3,261,879 (Banks) of July 19, 1966; U.S. 3,365,513 (Heckelsberg) of Jan. 23, 1968; British Pat. 1,054,864 (British Petroleum) of Jan. 11, 1967; U.S. 3,463,827 (Banks) of Aug. 26, 1969; U.S. application Ser. No. 846,977, filed Aug. 1, 1969; and U.S. application Ser. No. 816,052, filed Apr. 14, 1969.

The preparation, activation and maintenance of the heterogeneous olefin disproportionation catalysts are known in the art, and with reference to the specific systems discussed above, are disclosed in the above-mentioned patents and applications. The various solid catalysts exhibit different optimum reaction temperatures, pressures and contact times for the polymerization of the monomers of the invention. Generally, the preferred temperature, pressure, and time for the polymerization reaction will be substantially the same as the optimum conditions at which the olefin disproportionation catalyst will convert lower molecular weight acyclic olefins such as propylene, butenes, and pentenes. Excessively high reaction temperatures at which the monomers tend to decompose should be avoided.

The homogeneous catalysts which are particularly suited for the polymerization reaction comprise (a) a transition metal compound in admixture with (b) an organometallic compound. These catalysts are known in the art. Particularly suitable catalysts are disclosed in U.S. Pat. 3,492,278 (Uraneck et al.) of Jan. 27, 1970; U.S. application Ser. No. 810,021, filed Mar. 24, 1969; U.S. application Ser. No. 717,026, filed Mar. 28, 1968; and U.S. application Ser. No. 717,028, filed Mar. 28, 1968. The most preferred homogeneous catalysts are those comprising a Group VI–B metal compound in admixture with an organoaluminum halide compound as disclosed in the 717,028 application.

The preparation and use of homogeneous catalysts to effect the olefin disproportionation reaction are known in the art. Generally, the optimum conditions at which the catalyst effects the olefin disproportionation of lower molecular acyclic olefins such as pentenes and hexenes are employed for the polymerization reaction. When using the homogeneous catalysts, the molar ratios chosen of the organometallic reducing agent to the transition metal compound is also a function of monomer purity. Cyclic monoolefin, omega alkenyl-polycycloalkene, and cyclic polyolefin monomers frequently contain impurities which may react with the catalyst components. Accordingly, the monomers are preferably purified prior to contact with the homogeneous or heterogeneous catalysts. Molecular sieves can be employed to purify the monomers. The success of the purification operation will determine the optimum mol ratio of the organometallic compound to the transition metal compound. Whenever the feed does contain impurities, the organometallic compound is preferably used in molar excess with respect to the transition metal compound. The catalyst level in the homogeneous system is conveniently based on the amount of organometallic compound employed, and will generally be in the range of 0.15 to 150 gram millimoles per 100 grams of monomers.

As discussed above, the homogeneous catalyst is generally utilized in the presence of a diluent to accomplish the polymerization reaction. Any diluent which is essentially inert to the reaction (except in those cases where the monomer is employed as the diluent) can be employed. Aliphatic, cycloaliphatic, and aromatic hydrocarbons containing from 4 to 10 carbon atoms per molecule can be employed. Examples of such hydrocarbons are n-pentane, n-butane, n-hexane, isooctane, n-decane, cyclohexane, cyclopentane, methylcyclohexane, benzene, toluene, and xylene. Additionally suitable diluents are halogenated compounds such as chlorobenzene, tetrachloroethylene, and 1,2-dichloroethylene. Mixtures of any of these diluents can also be employed.

Any conventional contacting technique can be utilized to prepare the polymer, and batchwise or continuous operations are contemplated with both heterogeneous and homogeneous catalysts. After the reaction period, the polymer can be separated and isolated by conventional techniques such as by precipitation, coagulation, steam stripping, and the like. Unconverted monomer or products not desired can be recycled or discarded as desired. If desired, the catalyst can be destroyed using various materials well known in the art such as water or alcohol to deactivate the catalyst prior to separation of the products.

The adhesive formulation of the invention comprises the above-mentioned unsaturated polymers of cyclic monoolefins, a suitable tackifier, a suitable solvent and optionally a selected filler material. Suitable solvents for the formulation are any liquids in which the above-mentioned polymers are soluble, such as toluene, cyclohexane, chlorobenzene, benzene, n-hexane, chloroform, nitrobenzene and the like. Preferably, the solvent is one which will readily vaporize under the conditions of use for the adhesive formulations.

The homopolymers of cyclic monoolefins which contain no additives when dissolved in the above-mentioned suitable solvent show less inherent tack than desired. However, when admixed with a tackifier such as an ester of a partially hydrogenated rosin, e.g., a pentaerythritol ester of hydrogenated rosin, a marked improvement in tack and peel strength is realized for the polymer solutions. The tackifiers employed in this invenion can be esters of di- or polyhydric alcohols with an unmodified rosin, hydrogenated rosin or polymerized rosin. Examples include the glycerol ester of rosin, triethylene glycol ester of hydrogenated rosin, glycerol ester of polymerized rosin, pentaerythritol ester of hydrogenated rosin, pentaerythritol ester of rosin, ethylene glycol ester of hydrogenated rosin, ethylene glycol ester of polymerized rosin, glycerol ester of hydrogenated rosin, and the like. The adhesive properties of the adhesive formulations of the invention are comparable to those of natural rubber, especially in the preparation of pressure sensitive adhesives.

The amount of tackifier and polymer employed can vary widely depending on the desired adhesive properties. Generally, the amount of tackifier employed ranges from 1 to 100, preferably 10 to 80, parts per 100 parts by weight of polymer. The amount of polymer that can be employed in the formulation is in the range of from 1 weight percent to the maximum that can be dissolved in the solvent at the temperature of application.

Adhesive compositions of this invention can be prepared by any prior art mixing process that produces a homogeneous mixture. For example, the unsaturated polymer of the cyclic monoolefin can be admixed with a solvent that is relatively volatile and that can dissolve the polymer, such as toluene. The amount of diluent employed can vary widely. Generally, the amount of solvent ranges from 1 to 4 parts by weight per part by weight of the total solids present in the adhesive recipe. The term total "total solid" refers to the total amount of polymer, tackifier, filler, etc., that may be present in the recipe. The liquid formulation can then be spread on a suitable surface and allowed to dry at ambient temperatures before use. The drying time generally is sufficient to enable the solvent to evaporate, usually from a few minutes to several hours being sufficient. The method of mixing usually depends upon the final application of the adhesive.

The adhesives according to this invention can also contain fillers such as zinc oxide, titanium dioxide, aluminum hydrate, calcium carbonate, clay, pigments, and the like. The amount of filler can vary widely depending on the desired application of the adhesive. Generally, the amount of filler ranges from 0 to 100 parts by weight per 100 parts of polymer and tackifier.

Adhesives prepared in the above manner are useful as pressure sensitive adhesives. For example, after the coating procedure is completed, a coated surface can be pressed to an uncoated surface or another coated surface. For example, this adhesive can be used to bond cloth, paper, or plastic film, such as cellophane, polyethylene, and poly(vinyl chloride) to any other dry surface. Thus, these compositions can be employed as the adhesive coating on surgical tape, masking tape, and the like.

Developing practical adhesive formulations usually depends on obtaining desired balance between tack, peel strength, and creep resistance. Such a balance can be achieved by varying the inherent viscosity (molecular weight), trans-unsaturation content and the degree of branching in the unsaturated polymers of cyclic monoolefins.

For example, in the case or rubbery polymers of cyclopentene, at low inherent viscosities, the elastomers exhibit high tack, low peel strength, and low creep resistance, which are typical characteristics of low molecular weight elastomers. At an inherent viscosity from about 2 or higher, the elastomers have sufficient cohesive strength and bulk viscosity resulting in higher peel strength and higher creep resistance, while retaining sufficient tack for bonding. As mentioned previously, the molecular weight (inherent viscosity) of the cyclic monoolefin polymers can be controlled by copolymerization with acryclic olefins.

Inherent viscosity is measured by placing one-tenth gram of polymer in a wire cage made from 80 mesh screen and the cage is placed in 100 ml. of toluene contained in a wide-mouth 4-ounce bottle. After standing at room temperature (approximately 25° C.) for 24 hours, the cage is removed and the solution is filtered through a sulfur absorption tube of grade C porosity to remove any solid particles present. The resulting solution is run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The microstructure of the unsaturated polymer from the cyclic monoolefin also influences adhesive values in that at low trans-content peel strength is low, whereas at higher trans-content (greater than about 85 percent) higher peel strength is obtained. At a lower trans-content, the elastomer has reduced cohesive strength which is apparently related to a reduced green strength. For example, polymerization of cyclic monoolefins with molybdenum trichloride distearate and diethylaluminum chloride produces a polymer with high trans-content. The particular trans-content again depends upon the starting catalyst materials and the reaction conditions. Therefore, in addition to a inherent viscosity of about 2 or higher, for a better balance of adhesive properties the elastomer should have a trans-content of at least about 85 percent.

The following procedure is used in determining the trans-content of unsaturated polymer. Polymer samples are dissolved in carbon disulfide to form a solution having 25 grams of polymer per liter of solution. The infrared spectrum of each of the solutions (percent transmission) is then determined in a commercial infrared spectrometer.

The percent of the total unsaturation present as trans was calculated according to the following equation and consistent units:

$$\epsilon = \frac{E}{tc}$$

where $\epsilon$ equals extinction coefficient (liters-moles$^{-1}$-centimeters$^{-1}$); E equals extinction (log $I_0/I$); $t$ equals path length (centimeters); and $c$ equals concentration (mols double bond/liters). The extinction was determined at the 10.35 micron band and the extinction coefficient was 120.9 (liters-mol$^{-1}$-centimeters$^{-1}$). These calculations are based on the assumption of 1 double bond per 5 carbon atoms in the polymer.

Branching, which also influences adhesive properties, can be obtained by conducting the polymerization in the presence of the previously mentioned polycyclic olefins and/or omega - alkenyl - polycycloalkene compounds. Branching results primarily in improved creep resistance, good peel strength, and lower tack; but overall, in a desirable balance of adhesive properties.

The effect of branching can be determined by measuring the cold flow of the polymer. Reduced cold flow indicates the presence of branching in the polymer.

By proper formulation, using procedures known in the art, specific improvements in adhesive properties can be realized. For example, known fillers such as Cab-O-Sil, a fumed silica and the like, improve the creep resistance. Antioxidants and ultraviolet stabilizers, such as are known in the art, can also be added to the above compositions to retard or prevent polymer deterioration.

The invention is further illustrated by the following examples. The reactants, proportions, and other specific conditions are presented as being typical and should not be construed to limit the invention unduly.

EXAMPLE I

Cyclopentene was polymerized in 3 runs in the presence of diethylaluminum chloride and molybdenum dichloride distearate as the catalyst. The recipe and results were as follows:

TABLE I

|  | 1 | 2 | 3 |
|---|---|---|---|
| Toluene, parts by weight | 435 | 435 | 435 |
| Cyclopentene, parts by weight | 100 | 100 | 100 |
| Diethylaluminum chloride, mhm.[1] | 9 | 10 | 4.5 |
| Molybdenum trichloride distearate, mhm.[1] | 4.5 | 5 | 3 |
| Temperature, °F | 41 | 41 | 41 |
| Time, hours | 22 | 22 | 23 |
| Conversion, percent | 67 | 64 | 71 |
| ML-4 at 212° F.[2] | 123 | 123 | 47 |

[1] Gram millimoles per 100 grams monomer.
[2] ASTM D 1646-63 (Mooney viscosity).

Toluene was charged to the reactor first and it was then purged with nitrogen. The reactor was then closed, flushed with argon, and pressured with argon to 20 p.s.i.g. The molybdenum trichloride distearate was added, the reactor contents were cooled to approximately 0° C., cyclopentene was introduced, and then diethylaluminum chloride. The temperature was adjusted to 5° C. for the polymerization.

At the conclusion of each polymerization, the reaction was short-stopped with a 10 weight percent solution of 2,2'-methylene-bis(4-methyl-6-tert-butyl-phenol) in isopropyl alcohol, the amount used being sufficient to provide one part by weight of the antioxidant per 100 parts by weight of cyclopentene charged to the polymerization. Each reaction mixture was then diluted with 435 parts by weight of toluene per 100 parts by weight of cyclopentene charged and the mixture was agitated at 30° C. After thorough mixing had occurred, agitation was continued during the addition of isopropyl alcohol to coagulate the polymer. The polymer was separated and dried overnight at 60° C. in a stream of nitrogen. The products were elastomers.

EXAMPLE II

Polymers from Runs 1 and 2 were blended. Pressure sensitive adhesive compositions were prepared from this blend (Sample 1) and the product from Run 3 (Sample 2). Toluene solutions of eacch polymer were prepared and a pentaerythritol ester of hydrogenated rosin was added as a tackifier to each solution. Tack and peel strength were determined using Mylar film as the backing for the test formulations and type 302 stainless steel as the substrate.

ASTM Test Method D-1000-61 for pressure-sensitive adhesive insulating tape was used with slight modification. Number 302 stainless steel strips, 1.5 x 6 inches, in good mill condition were wiped with toluene using a paper tissue. After the toluene had evaporated they were wiped with a dry tissue. One inch strips of the pressure-sensitive films were placed on the metal plates and rolled once each way with a 4.5 pound rubber coated roller. The strips were long enough that 5 to 6 inches extended past the end of the metal plate. After the film had remained on the metal from 15-25 minutes the free end was pulled back exposing approximately 1 inch of the metal. The exposed portion of the plate was clamped in the upper jaw of an Instron testing machine and the free end of the film was doubled back and clamped in the bottom movable jaw. The film was thus stripped at an angle of 180° and at a rate of 6 inches/minute (crosshead speed=12 inches/minute). The force necessary to strip the approximate center 4 inches of the tape was determined by visually averaging with a straight line the stress-strain curve obtained on the autographic chart recorder. The height at the center of the line was taken as the average peel or stripping strength, expressed in pounds/inch width.

The recipe employed and the results were as follows:

Recipe

| | Parts by wt. |
|---|---|
| Toluene | 80 |
| Polymer | 12 |
| Tackifier | 8 |

TABLE II

| Sample | Polymer, inherent viscosity | Microstructure, percent trans | Tack, lb./in.[1] width (PPIW) | Peel strength,[1] lb./in. width (PPIW) |
|---|---|---|---|---|
| 1 | 3.01 | | 2.4 | [2] 7.6 |
| 2 | 2.02 | 99 | 2.5 | [2] 4.0 |

[1] Maximum value.
[2] Cohesive failure.

It is apparent that these two compositions evidence a tack that is desirable for pressure sensitive adhesive compositions, i.e., an inherent viscosity of 2 or higher is desirable.

EXAMPLE III

Polymers of cyclopentene were prepared according to the general procedure in Example I and formed into pressure sensitive adhesive compositions as in Example II. The elastomers were dissolved in 80 parts by weight of toluene and pentaerythritol ester of hydrogenated rosin added as tackifier. The total solids (polymer+tackifier) content of the solution was 20 parts by weight per 100 parts by weight of solution. Tack and peel strength were tested according to the procedure in Example II. Creep resistance was tested as follows: A two-pound weight was hung from a vertical one-inch wide strip of the adhesive on Mylar overlapped one inch square on a stainless steel substrate. The time required for ⅛-inch slippage or to complete failure of the adhesive bond was recorded with the weight attached at an angle of 178° to a substrate. The results are as follows:

TABLE III

| Run: | Inherent viscosity | Microstructure, percent trans | Tackifier, parts by wt. | Tack, PPIW | Peel strength, PPIW | Creep resistance at room temperature, hours to failure |
|---|---|---|---|---|---|---|
| 1 | 3.35 | 85 | 8 | 1.8 | 2.5 | 48 |
| 2 | 3.35 | 85 | 12 | [1]2.8 | [1]4.5 | 48 |
| 3 | 2.39 | 91 | 12 | [2]4.1 | [2]2.5 | 1.5 |
| 4 | 2.79 | 68 | 12 | [2]4.8 | [2]1.7 | <0.8 |
| 5 | [3]3.02 | | 8 | 0.4 | 3.8 | 57 |
| 6 | [3]3.02 | | 12 | [1]0.1 | [1]3.6 | 42 |
| 7 | 3.17 | 80 | 12 | [2]2.4 | [2]7.5 | <8 |

[1] Adhesive failure.
[2] Cohesive failure.
[3] Branching agent—cyclopentadiene, 1.3 wt. percent of the total monomer mixture.

Tack, peel strength, and creep resistance can be altered by varying the inherent viscosity, the amount of tackifier, the amount of trans-content in the polymer, or by the addition of a branching agent in the polymerization process.

Reasonable variations and modifications are possible in the scope of this disclosure without departing from the spirit and scope thereof.

We claim:
1. A process for bonding one surface to another surface, said process comprising the steps of: coating at least one of said surfaces with a mixture comprising an unsaturated polymer of a cyclic monoolefin having 5, or 7-10 carbon atoms per molecule and a tackifier of esters of di- or polyhydric alcohols with unmodified rosin, hydrogenated rosin or polymerized rosin; and pressing said other surface to said coated surface.
2. A process according to claim 1 wherein said mixture contains from 1 to 80 parts of said tackifier per 100 parts of said polymer.
3. A process according to claim 1 wherein said tackifier is a pentaerythritol ester of hydrogenated rosin.
4. A process according to claim 1 wherein said polymer is a polymer of cyclopentene.
5. A process according to claim 1 wherein the trans-content of said polymer is at least 85 percent.
6. A process according to claim 1 wherein the inherent viscosity of said polymer is at least 2.0.
7. The process according to claim 1 wherein said polymer is polymerized in the presence of a branching agent of a cyclic conjugated diene or a fused-ring hydrocarbon.
8. The process according to claim 7 wherein said branching agent is cyclopentadiene.
9. A pressure sensitive adhesive comprising a mixture of an unsaturated polymer of a cyclic monoolefin having 5, 7-10 carbon atoms per molecule and a tackifier of esters of di- or polyhydric alcohols with unmodified rosin, hydrogenated rosin, or polymerized rosin.
10. An adhesive according to claim 9 wherein said mixture contains from 1 to 80 parts of said tackifier per 100 parts of said polymer.
11. An adhesive according to claim 9 wherein said tackifier is a pentaerythritol ester of hydrogenated rosin.
12. An adhesive according to claim 9 wherein said polymer is a polymer of cyclopentene.
13. An adhesive according to claim 9 wherein the trans-content of said polymer is at least 85 percent.
14. An adhesive according to claim 9 wherein the inherent viscosity of said polymer is at least 2.0.
15. An adhesive according to claim 9 wherein said polymer is polymerized in the presence of a branching agent of a cyclic conjugated diene or a fused-ring hydrocarbon.
16. An adhesive according to claim 15 wherein said branching agent is cyclopentadiene.

References Cited

UNITED STATES PATENTS 3,541,188 11/1970 Srail _____ 156—334 X
3,554,940 11/1971 Arakawa et al. ____ 260—27 R X EDWARD G. WHITBY, Primary Examiner U.S. Cl. X.R.

117—122 PA, 138.8 E, 161 R; 156—327; 260—27 R